Nov. 22, 1966  E. E. TURNER  3,287,692
BENDER TYPE ELECTROACOUSTICAL APPARATUS
Original Filed Dec. 9, 1957
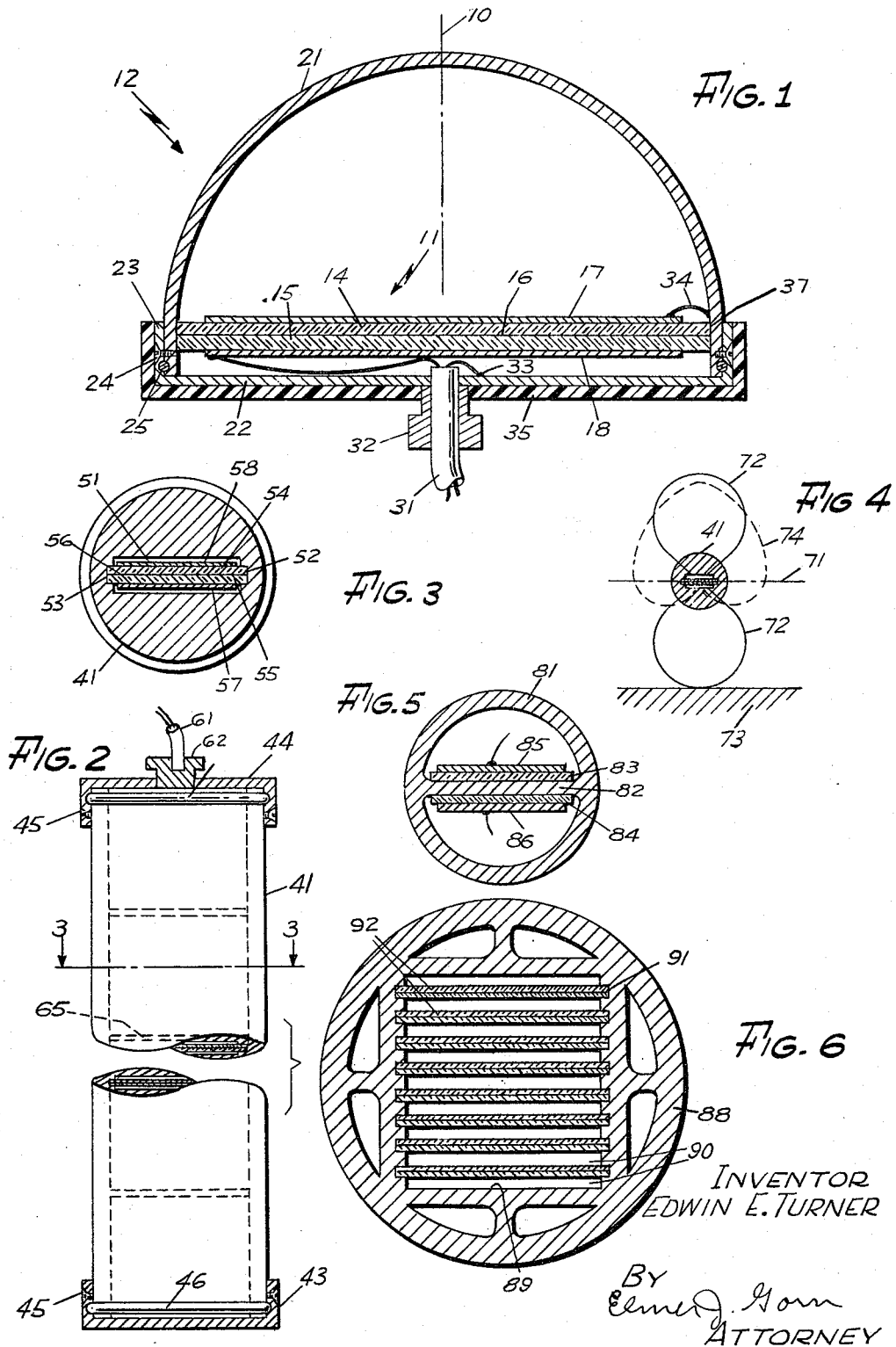
INVENTOR
EDWIN E. TURNER
BY
ATTORNEY

United States Patent Office 3,287,692
Patented Nov. 22, 1966

3,287,692
BENDER TYPE ELECTROACOUSTICAL APPARATUS
Edwin E. Turner, Newport, R.I., assignor to Raytheon Company, a corporation of Delaware
Continuation of abandoned application Ser. No. 701,552, Dec. 9, 1957. This application Feb. 13, 1963, Ser. No. 258,957
4 Claims. (Cl. 340—10)

This in a continuation of copending application Serial No. 701,552, filed on December 9, 1957, now abandoned.

The present invention relates in general to electroacoustical systems and more particularly concerns novel apparatus utilizing a bender transducer for efficiently generating and responding to relatively low frequency sonic waves.

Generally speaking, a bender transducer or "bender" is a flexing transducer formed of electrode-carrying piezoelectric or magnetostrictive plates capable of deforming in opposite directions when appropriately activated. For example, a piezoelectric bender may consist of two transverse expander plates, cemented face to face in such manner that a voltage applied to the electrodes thereon causes opposite deformations, resulting in a bending action. Conversely, mechanical bending of the transducer will result in the generation of a corresponding signal between the electrode terminals. Thus, by bender design, it is possible to achieve displacements in response to applied signals which are considerably greater than the corresponding displacement in either one of the constituent plates above. This capacity for relatively large motions is the most advantageous characteristic of the bender transducer. The term "bender" or "bender transducer" as used herein is intended to refer to the disc-like structure consisting of the expander plates having electrodes thereon, whether or not the electrodes are specifically mentioned in connection with the term.

In order to use a bender piezoelectric element, such as barium titanate, to best advantage to achive maximum power with a minimum of material, it is necessary that the complete transducer, of which the bender element is a part, have a relatively high overall loaded Q in the acoustic medium in which the transducer is to be immersed. In general wide band width operation is available at the expense of greater overall weight or by a sacrifice in conversion efficiency. Where it is desired that a transducer serve for transmission as well as reception, the importance of retaining high conversion efficiency is evident.

In the following description it is to be understood that "effective vibrating mass" means that portion of the actual mass which determines the effective Q of the system. More specifically, "effective vibrating mass" means that mass which, if concentrated at the point of maximum amplitude of the system, would store the same amount of kinetic energy as the actual mass stores by virtue of its distribution in space and the distribution of amplitudes which are associated with its various parts.

In the bender mode of operation, the effective vibrating mass is only a fraction of the scale weight of the device. Consider for example, a disc type bender clamped along its periphery to a large rigid mass. If energized so that the disc vibrates in its first mode, wherein the displacement of the center of the disc is at right angles to its plane, with a Rayleigh-Bessel function distribution of amplitude from center to outer edge, it can be shown that the effective vibrating mass of the disc alone, that is the mass which determines the effective Q when the disc alone is loaded, is only 0.183 times the scale weight of the disc. Other bender configurations such as rectangular plates flexing about an axis parallel to a pair of opposed edges, have similarly small ratios of effective vibrating mass to scale weight. In addition, since the thickness of a bender disc or rectangular plate is necessarily small in proportion to its other dimensions for low frequency operation, it follows that the scale weight is small in comparison to area. Hence the effective vibrating mass is even smaller in terms of the mass required to attain the desired high loaded Q for the device.

It is possible to raise the total effective vibrating mass by the direct expedient of adding actual weight to the vibrating bender element. Where the added weight is uniformly distributed over the bender surface and adapted to vibrate with it in the same mode, this technique adds scale weight to the system in greater proportion than the addition of effective vibrating mass. If weight is added to move as whole at the radiating surface, the scale weight of the transducer increases in direct proportion to the increase in effective vibrating mass. In either case, therefore, the desired increase in effective vibrating mass is accompanied by an undesirable, significant increase in system scale weight.

The present invention contemplates and has as a primary object the provision of a broadband bender activated transducer of lightweight, compact design and high conversion efficiency, particularly well suited for generating and responding to low frequency sonic waves in an acoustic medium, such as water. This is achieved by employing mechanical transformation between the bender and a radiating enclosure with the result that the normally small vibrating mass of the bender appears as a relatively larger effective mass at the radiating surface. Larger effective vibrating mass is thus obtained with minimum scale weight for the complete transducer.

In one specific form of the invention a disc-shaped bender transducer is enclosed by a hemispherical shell radiator of larger mass, the circular edge of the shell being rigidly secured to the periphery of the bender. With the bender adapted to vibrate in the mode previously described, maximum amplitude will occur at the center, and the bender will impart a lesser vibration amplitude to the shell which is related to the mass ratio. The total effective vibrating mass of the system is greater than the combined mass of bender and shell, and within limits, may be made as high as desired. The loaded Q of the transducer system is, as a result, correspondingly high with minimum increase in actual scale weight.

Alternatively, a rectangular plate bender may be diametrically disposed within a hollow cylindrical radiating enclosure. With the axis about which the bender flexes parallel with the axis of the cylinder, and with the opposed edges of the bender which are parallel to the cylindrical axis secured to the interior wall of the cylinder, an efficient line transducer is obtained. The bender may be supported simply along a pair of edges as described, or the individual bender elements may be secured to opposite sides of an internal web provided for support.

It is accordingly another object of this invention to provide a multiplicity of broadband transducer configurations activated by bender elements and utilizing mechanical transformation techniques to enhance the effective vibrating mass seen by the acoustic medium.

It is a further object of the invention to provide a transducer wherein the enclosure functions as a radiator activated by a bender element.

A still further object of this invention is to provide electroacoustical apparatus for transmitting and receiving low frequency sonic signals wherein the edges of a bender transducer are secured internally to a radiating enclosure.

Another object of this invention is to provide a bender activated linear acoustical radiator adapted for combination with like radiators to achieve desired radiation patterns.

Other objects, features and advantages will now become apparent from the following specifications when read in connection with the accompanying drawing in which:

FIG. 1 is a cross-sectional view of an acoustical energy transmitting and receiving device utilizing a disc-shaped bender transducer element;

FIG. 2 is a front view of a linear transducer embodying the principles of this invention;

FIG. 3 is a cross-sectional view of the linear transducer taken along the lines 3—3 of FIG. 2;

FIG. 4 is a graphical representation of radiation patterns available with the transducer of FIGS. 2 and 3;

FIG. 5 is a cross-sectional view of a linear transducer illustrating an alternative mode of mounting the bender components; and FIG. 6 is a cross-sectional view of a linear transducer illustrating the use of a multiplicity of bender plates.

With reference now to the drawing and more particularly FIG. 1 thereof, there is illustrated an electroacoustical transmitter and receiver incorporating the concepts of the present invention. Inasmuch as the apparatus disclosed in FIG. 1 is circularly symmetrical about vertical axis 10, the single cross-sectional view adequately reveals the structural details.

As is seen in FIG. 1, the transmitting and receiving transducer is formed of a disc-shaped bender transducer or bender 11 rigidly secured within a hemispherical enclosure 12 which functions as a radiator as thoroughly explained hereinafter. Inasmuch as the term bender is commonly used in the art to refer to a "bender transducer" per se comprised of two expander plates mounted in face-to-face relationship and having characteristics as described hereinbefore, these terms as used herein are synonymous. More specifically, the bender of FIG. 1 is constituted of a similarly shaped pair of flat circular piezoelectric expander plates 14 and 15 cemented into rigid surface contact over the coincident circular area 16 and having a pair of opposed circular electrodes 17 and 18 adhered to the opposite outer surfaces of plates 14 and 15 respectively to permit the application of a transmitter drive signal, or the output of a generated signal in response to received sonic waves.

Expander plates 14 and 15 deform radially, but oppositely, upon the application of a given potential between electrodes 17 and 18. This unequal deformation results in bender vibration perpendicular to the surface with peak amplitude at the center as previously described.

The enclosure 12 is formed of a hemispherical shell 21 sealed off by a lower cover plate 22 having an upturned flange 23. A multiplicity of small screws 24 secure the cover plate 22 through flange 23 to the shell 21, and to provide a hermetic seal an O-ring 25 is set in appropriate grooves formed in the secured members.

A coaxial cable 31 passes through a fitting 32 and a central opening in cover 22. The outer shield of the cable is grounded to the enclosure at 33, while the center conductor contacts electrode 18. Electrode 17 is grounded by lead 34 to complete the circuit to the bender disc, the ground connection at 33 being spaced a sufficient distance away from electrode 18 or insulated at least in part along its length to prevent electrode 18 from shorting to ground during vibration. A Corprene plastic cover 35, which fits snugly over the cover 22 completes the assembly.

The entire circular edge 37 of the bender 11 is securely affixed, as with cement, to the inner circular edge of hemispherical shell 21, and inasmuch as the bender 11 is otherwise unsupported, vibration of circular edge 37 parallel to axis 10 will impart corresponding vibration to shell 21. In other words, the arrangement shown constitutes an inertia drive, whereby vibration of the bender 11 is imparted to shell 21, and conversely, whereby axial vibration of shell 21 will result in the generation of electrical signals between electrodes 17 and 18.

Consider now, the effects of the application of an electrical signal between electrodes 17 and 18, which as earlier noted causes the bender 11 to vibrate with a maximum amplitude at the center in a direction perpendicular to its plane. These vibrations are imparted in the same axial direction to the hemispherical shell 21, but at an amplitude inversely proportional to the ratio of the mass of the hemisphere to the effective vibrating mass of the bender 11. Thus, if the effective vibrating mass of the bender 11 is $m_1$ and the mass fastened to its periphery, namely enclosure 12, is $m_2$, $m_2$ being larger than $m_1$, then the amplitude of vibration of the mass attached to the periphery is by virtue of mechanical transformation the fraction $m_1/m_2$ times the amplitude of vibration at the center of the disc.

The total effective vibrating mass is expressed as: $m_t = m_2(1 + m_2/m_1)$. Evidently then, by a suitable choice of the ratio $m_2/m_1$, the effective vibrating mass may be made as high as desired, within practical limits, of course, and the loaded Q of the entire transducer when immersed in an acoustic medium, such as water, may be made correspondingly high. The increase in actual scale weight is at a minimum, since as is evident from the expression above, $m_t$ exceeds the combined masses $(m_2 + m_1)$, of shell and bender, respectively.

As an example of the effectiveness of the foregoing, if the mass ratio, $m_2/m_1$ is 11/1, then the entire transducer, as in FIG. 1, will weight only 12% as much as a conventional transducer having the same effective vibrating mass, or the same Q, in which the loading mass is applied, as discussed earlier, directly to the bender radiating surface; and an even smaller percentage of the weight of a conventional disc type bender transducer in which the added mass is disposed over and vibrates with the plate.

The mass $m_2$ in general is relatively small since $m_1$ is of necessity small, but the shell 21 must be sufficiently stiff so that it moves as a unit. In this way the acoustic loading from the surrounding acoustic medium, such as water, is transferred without change to the periphery 37 of the bender 11 where the requisite forces for radiation are taken off at the correct amplitude for proper impedance match to achieve the desired Q. Hemispherical shell 21 is preferably of steel and of the chosen weight. Its diameter is preferably such that all path lengths for sound measured along any arc from the junction with the periphery 37 of the bender 11 to the top of the hemisphere are no greater than one-eighth wavelength at the velocity of sound in the material of which the hemisphere is made. The hemispherical shape is of advantage from the standpoint of stiffness. Other shapes for the enclosure may, however, be used.

The apparatus shown in FIG. 1 may of course be adapted to meet the frequency and power requirements of various systems. The following table sets forth the design parameters and performance characteristics of an entire transducer of this type operative at five kilocycles per second.

| | |
|---|---|
| Air weight pounds | 3.46 |
| Power out in an array where $P_c$ (ultimate loading) obtains acoustic watts | 278 |
| Watts per pound of air weight | 80.25 |
| Effective vibrating mass pounds | 28.1 |
| Mass ratio 11.12 to 1. | |
| Weight of front hemisphere pounds | 2.32 |
| Weight of barium titanate plate pounds | 1.14 |
| Diameter of barium titanate plate inches | 6.25 |
| Thickness of barium titanate double plate inches | 0.187 |
| Radiating area sq. cm | 198.5 |
| Effective vibrating mass of plate pound | 0.2085 |
| Weight of transducer in water pounds | 1.08 |
| Watts per pound of water weight watts | 257 |
| Material of front hemisphere | Steel |
| Thickness of front hemisphere inch | 0.135 |
| Q in water | 13.5 |
| Transducer thickness inches | 3.5 |

As the frequency decreases, size proportionately increases. For example, at one kilocycle the diameter of the system is 31 inches.

In the previous discussion the emphasis has been placed on a mass ratio wherein the mass $m_2$ of the enclosure exceeded the effective mass $m_1$ of the bender. The mass ratio $m_2/m_1$ may however be chosen to be equal or less than unity, by making the mass of the enclosure respectively equal to or less than the effective mass of the bender. With a mass ratio of unity, there is no amplitude transformation, that is, the enclosure displacement equals that of the center of the bender. The advantage of such an arrangement is that radiating area of the entire transducer is larger than that obtainable with the bender alone.

If the mass of the enclosure is chosen as less than that of the bender, the scale weight of the system will exceed the effective vibrating mass, however, a considerable gain in band width would be realized and the advantages with respect to radiating area retained.

Referring now to FIGS. 2 and 3, an alternative embodiment of the invention, in the form of a line transducer is illustrated. Structurally, the line transducer comprises a hollow cylindrical body member 41 preferably formed as an aluminum extrusion, enclosed between a pair of tightly fitting circular end caps 43 and 44, the latter being secured by a plurality of small screws 45. To hermetically seal the cylindrical body 41, O-rings 46 and 47 are provided in appropriate annular grooves, as shown.

Details of the internal structure of body 41 are best seen with reference to FIG. 3. A generally rectangular hollow region 51 extends axially through the body, the side walls thereof being formed with diametrically opposed slots 52 and 53. Two rectangular piezoelectric expander plates 54 and 55 are rigidly secured to each other, as with cement, over the common rectangular surface 56. A pair of rectangular electrodes 57–58 are attached to the opposed external surfaces of expander plates 54 and 55, respectively, to provide means for energizing the bender or conversely deriving a signal therefrom. With reference to FIG. 2, a coaxial cable 61 extending through a watertight fitting 62 in upper cap 44 furnishes the means for electrically contacting electrodes 57 and 58.

Returning to FIG. 3 it is seen that the bender formed by piezoelectric expander plates 54 and 55 securely fits into and is supported over its entire length in grooves 52 and 53. Accordingly, the bender defines a diametral plane and the axis about which this transducer flexes is parallel with the axis of the cylindrical body 41.

The barium titanate expander plates 54 and 55 may extend the entire axial length of cylindrical body 41 or a plurality of individual, adjacent rectangular expander plates may be inserted side by side as illustrated in FIG. 2, so that the small intermediate air spaces, such as 65, will break up the effects of Poisson ratio expansion in the driving mechanism along the axis of the cylinder. The spacing between adjacent plates can be relatively small, it being sufficient to prevent acoustical contact.

Returning to FIG. 3, it is evident that as the bender made up of expander plates 54 and 55 flexes about the axis of cylindrical body 41, a translational motion will be imparted to the entire cylindrical body in a direction perpendicular to the diametral plane of the bender formed by expander plates 54 and 55. In this embodiment, the entire extruded cylinder, including the end caps, constitutes the driven mass. The effective vibrating mass is the result of the mechanical transformation occurring by virtue of the difference in amplitude of vibration at the center of the expander plates 54–55 and the edges thereof. By suitably choosing the cross-sectional configuration of the body 41, and the material therefor, the Q of the transducer shown in water may be made as high as desired within practical limits. The cross section illustrated in FIG. 3 will provide a transducer which is extremely dense since the internal air space is maintained at a minimum. This is particularly advantageous in attaining a high sinking rate for such units when used individually or in arrays.

The transducer configuration shown in FIGS. 2 and 3 is particularly advantageous because of the ease of fabrication. The expander plates 54–55 may be assembled on an external holder and the electrodes 57–58 preconnected. Thereafter, the transducer elements may be inserted into the long extrusion with cement applied to opposite grooves 52 and 53 over their entire length. After the end caps 43 and 44 are in place the entire transducer body structure may be coated with Teflon to preclude water leakage and corrosion.

FIG. 4 is a graphical illustration of radiation patterns available with the transducer disclosed in FIGS. 2 and 3. The transducer body 41 is illustrated as symmertrically positioned upon diametral plane 71. Under normal conditions in a substantially infinite acoustical medium, the radiation pattern for this transducer will appear as the figure-of-eight 72. In other words, radiation is symmetrical about diametral plane 71. By introducing a reflecting plane 73, the radiation pattern my be converted to a cardioid indicated by the broken line 74. Numerous other radiation patterns are, of course, available by arranging spaced arrays of transducers of the type illustrated in FIG. 2 and by appropriately phasing the input signals to the respective transducers.

A modification of the cylindrical transducer illustrated in FIGS. 2 and 3 is illustrated in the cross-sectional view of FIG. 5. Here, as with the embodiment described immediately above, the transducer body is an elongated, cylindrical extrusion 81. This extrusion, which may be aluminum, is formed with an integral, diametral flat web 82, opposite surfaces of which, as shown, support the constituent barium titanate piezoelectric expander plates 83 and 84. Electrodes 85 and 86 furnish the means for energizing the bender structure shown, and in view of the basic similarity to the device shown in FIG. 2, the end caps, and the mechanism for energizing the system electrically, have not been illustrated. It is clear however that with piezoelectric elements 83 and 84 securely cemented to web 82, bender action about the axis of the cylindrical structure 81 is substantially the same as that disclosed above in connection with FIGS. 2 and 3. The embodiment shown in FIG. 5, however, may be driven somewhat harder since metallic web 82 readily conducts heat from the vibrating plates to the outer cylindrical case which is in contact with the acoustic medium, ordinarily water. As in connection with the transducer disclosed in FIG. 2, the titanate plates 83–84 may be axially continuous, or preferably formed of a plurality of acoustically spaced smaller plates. The plates may be initially arranged in the right order and electrically connected together. Thereafter, the central web 82 may be coated with cement and the assembly of plates slid into the tube from one end thereof. To achieve the desired close degree of surface contact between plates 83 and 84 and the web 82, a pneumatic pressing device in the form of a long semicylindrical rubber bag may be inserted with the titanate plates. When inflated the pneumatic bag will uniformly press the plates securely into place. This arrangement is permanent and precludes servicing; however, the cost of manufacture of this configuration is sufficiently low as to permit a unit to be discarded in the event of failure.

A further modification of the concepts disclosed earlier in connection with FIG. 2 is illustrated in FIG. 6. Here again, the transducer body is an elongated cylindrical extrusion 88 formed with a generally square cross-section interior opening 89 and a plurality of ducts, such as 90 through which air may be forced for cooling. A pair of opposite sidewalls of the hollow square interior are formed with continuous parallel rectangular grooves, such as 91, which as shown support a plurality of parallel benders 92. The bender driving electrodes and lead wires, which are as in the previous figures, have been omitted for clarity.

Eight benders 92 are shown in FIG. 6, however, the number used may be adapted to particular design requirements. All of the benders 92 are driven in parallel and flex in the same direction, about an axis parallel to the cylindrical axis of the body 88, in response to a voltage of a given polarity. Hence in operation, the flexing motion of each bender 92 is imparted to the body 88 in phase, as a result of which the body 88 translates along an axis perpendicular to the benders 92.

The feature of this embodiment is that the active bender material, which determines maximum power output, is increased materially. Further, since a relatively large mass is required to achieve the necessary stiffness of body 88, the use of a large number of parallel benders 92 permits a lower mass ratio as required for some applications.

A further feature of the bender configuration shown in FIG. 6 is that the twisting couple applied to the body 88 at the secured edge of each bender is cancelled by the twisting couple of the adjacent bender edge. The result is that substantially pure translational forces are applied to body 88.

The specific embodiments disclosed in the drawing and described herein are exemplary only. It is apparent that those skilled in the art may now be able to make numerous modifications and departures without departing from the inventive concepts. Consequently, the invention is to be construed as limited only by the spirit and scope of the appended claims.

What is claimed is:

1. An electroacoustical transducer comprising a pair of expander plates joined into a rigid surface contact over their coincident areas, a pair of opposed electrodes, one of each electrodes adhered to opposite outer faces of said plates, said expander plates and electrodes having a combined effective vibrating mass which is a fraction of the combined actual mass of said plates and said electrodes, and a rigid shell radiator enclosing said plates and having a circular edge rigidly secured to an edge of each of said expander plates and moveable therewith, said shell having an actual mass greater than the combined effective vibrating mass of said plates and said electrodes, and the combined total effective vibrating mass of the combination of said plates, electrodes, and shell being greater than the combined actual mass of said plates, electrodes and shell radiator.

2. Electroacoustical apparatus comprising, in combination, a circular bender transducer of effective mass $m_1$ and a relatively rigid hollow substantially hemispherical enclosure thereof of an actual mass $m_2$, a circular edge of said hemispherical enclosure being secured to and adapted to vibrate in unison with a circular edge of said bender transducer, said apparatus thereby providing a combined effective vibrating mass equal to $$m_2(1+m_2/m_1)$$

3. Electroacoustical apparatus in accordance with claim 2 wherein said apparatus is adapted to vibrate at a selected frequency of operation and the length of a circular arc measured in said hemispherical enclosure of the intersection thereof with its axis of symmetry to a point of contact with said bender transducer is a miximum of one-eighth wave length of acoustical energy as transmitted in said hemispherical shell at the selected frequency of operation of said apparatus.

4. Electroacoustical apparatus comprising, in combination, a circular bender transducer, an enclosure for said bender transducer formed of a relatively rigid hollow hemispherical shell hermetically sealed to a generally flat base plate having a flange with an O-ring mounted between said flange and said shell, said circular bender transducer being secured along the periphery thereof to the interior of said hemispherical shell in substantially parallel spaced relationship with said base plate.

References Cited by the Examiner

UNITED STATES PATENTS

| | | | |
|---|---|---|---|
| Re. 24,191 | 7/1956 | Jaffe | 310—9.4 |
| 2,064,911 | 10/1935 | Hayes | 340—9 |
| 2,405,226 | 8/1946 | Mason | 340—10 |

CHESTER L. JUSTUS, *Primary Examiner.*

G. M. FISHER, *Assistant Examiner.*